US 012123940B2

(12) United States Patent
Emmerling et al.

(10) Patent No.: US 12,123,940 B2
(45) Date of Patent: Oct. 22, 2024

(54) DISTANCE MEASURING SYSTEM

(71) Applicant: Continental Automotive GmbH, Hannover (DE)

(72) Inventors: Ulrich Emmerling, Kelheim (DE); Franz Plattner, Arnschwang (DE); Thomas Reisinger, Regenstauf (DE); Stefan Meckl, Brennberg (DE)

(73) Assignee: Continental Automotive GmbH, Hannover (DE)

( * ) Notice: Subject to any disclaimer, the term of this patent is extended or adjusted under 35 U.S.C. 154(b) by 59 days.

(21) Appl. No.: 17/767,417

(22) PCT Filed: Oct. 7, 2020

(86) PCT No.: PCT/EP2020/078042
§ 371 (c)(1),
(2) Date: Apr. 7, 2022

(87) PCT Pub. No.: WO2021/069467
PCT Pub. Date: Apr. 15, 2021

(65) Prior Publication Data
US 2024/0103153 A1    Mar. 28, 2024

(30) Foreign Application Priority Data
Oct. 10, 2019  (DE) ..................... 10 2019 215 538.3

(51) Int. Cl.
*G01S 13/76*    (2006.01)
*B60R 25/20*    (2013.01)
*B60R 25/24*    (2013.01)

(52) U.S. Cl.
CPC ......... *G01S 13/765* (2013.01); *B60R 25/2072* (2013.01); *B60R 25/245* (2013.01)

(58) Field of Classification Search
CPC . B60R 25/2072; B60R 25/245; B60R 25/248; G01S 11/02; G01S 5/02;
(Continued)

(56) References Cited

U.S. PATENT DOCUMENTS

2005/0134477 A1    6/2005   Ghabra et al.
2014/0213193 A1    7/2014   Zhang et al.
(Continued)

FOREIGN PATENT DOCUMENTS

DE    102004049664 A1    7/2005
DE    102017201308 A1    8/2018
(Continued)

OTHER PUBLICATIONS

Office Action dated Aug. 24, 2020 from corresponding German patent application No. 10 2019 215 538.3.
(Continued)

*Primary Examiner* — Sisay Yacob

(57) ABSTRACT

Disclosed is a distance measuring system for measuring distance of a first transceiver from second transceivers, comprising the first transceiver having a first time zone, a second transceiver having a second time zone, and a control unit having a control-unit time zone. The second transceiver ascertains a time-zone relationship between the second transceiver and the first transceiver, and transmits the time-zone relationship to the control unit. The control unit receives the time-zone relationship, and ascertains, using the received time-zone relationship, a time-zone relationship between the control-unit time zone and the first transceiver. The first transceiver transmits at a defined instant in time or for a defined time period of the first time zone a distance measurement command to the second transceiver. The first transceiver transmits a measurement signal at a further
(Continued)

defined instant in time, and the second transceiver switches from an inactive into an active receiving or measuring state.

14 Claims, 3 Drawing Sheets

(58) Field of Classification Search
CPC .. H04M 1/72403; G06F 1/06; G07C 9/00309; G07C 2009/00793; G07C 2209/63
See application file for complete search history.

(56) References Cited

U.S. PATENT DOCUMENTS

| | | | |
|---|---|---|---|
| 2014/0253388 A1* | 9/2014 | Jalali | G01S 5/02216 342/458 |
| 2015/0002271 A1* | 1/2015 | Lee | H04W 52/0216 340/10.1 |
| 2017/0195109 A1* | 7/2017 | Perez-Cruz | G01S 5/0081 |
| 2018/0275268 A1* | 9/2018 | Reisinger | H04L 7/0008 |
| 2019/0355196 A1 | 11/2019 | Plattner et al. | |
| 2020/0114875 A1* | 4/2020 | Stitt | H04B 7/15 |
| 2020/0245111 A1 | 7/2020 | Heininger et al. | |
| 2021/0245707 A1* | 8/2021 | Golsch | B60R 25/245 |
| 2021/0246693 A1* | 8/2021 | Elangovan | G06F 21/44 |

FOREIGN PATENT DOCUMENTS

| | | |
|---|---|---|
| DE | 102017217978 A1 | 4/2019 |
| DE | 102019212669 A1 | 2/2021 |
| EP | 3386218 A1 | 10/2018 |

OTHER PUBLICATIONS

International Search Report and Written Opinion dated Jan. 27, 2021 from corresponding International Patent application No. PCT/EP2020/078042.

* cited by examiner

DISTANCE MEASURING SYSTEM

The invention relates to a distance measuring system for measuring a distance of a first transceiver from second transceivers, to a smartphone comprising said first transceiver, to a vehicle comprising said second transceivers, to a method for measuring a distance of a first transceiver from second transceivers, to the use of a distance measuring system for a building entry system, and to the use of a distance measuring system for contactless payment or for cash withdrawal.

Smartphones or radio keys can be used to unlock a vehicle, for instance an automobile. In response to, for example, a low-frequency signal from an unlocking circuit of the vehicle, which is transmitted as soon as the user touches the handle of the vehicle door, these measure the signal strength of the received signal, and transmit the measured value back to the unlocking circuit. The unlocking circuit can estimate from the signal strength the approximate position and hence also the distance of the key. If it is identified that the distance lies in a predefined range, the unlocking circuit unlocks the vehicle. An attacker can interfere with the signal-strength measurement by using relay transponders, which amplify the signal from the unlocking circuit and relay same to the radio key, which then responds and sends the response signal, containing the measured values of the signal strength, again via the transponder back to the unlocking circuit. Hence the unlocking circuit receives a signal-strength measured value from the key that indicates that the key is close to the vehicle, even though the distance is large, and opens the door of the vehicle.

Verifying whether the user, or the radio key, is actually close to the vehicle can be achieved by a distance measurement, for instance performed by measuring a transit time of a radiofrequency signal between communication equipment in the smartphone or radio key and in, or on, the vehicle. An important factor here is to minimize the amount of energy required for this, for instance in the smartphone or in the distance measuring equipment in the vehicle.

Hence the object of the invention is to provide a system that can be used to minimize the energy required, and thus the costs, in system components involved.

The object is achieved by the subjects of the independent patent claims. The dependent claims, the following description and the figures relate to advantageous embodiments.

Technical terms are used in the sense known to a person skilled in the art. When a specific meaning is attached to certain terms, definitions of terms are given below, in the context of which the terms are used.

The term "command", for instance as in "distance command", is to be understood in this disclosure to mean a digital or analog signal that is transferred by wire or wirelessly. A digital signal may be here, for example, an encoded instruction composed of one or more bits, or a voltage that originates from a digital circuit and can have two values. Correspondingly, an analog signal is usually produced by an analog circuit, for example. In the present case, this may also be a voltage that constitutes a supply voltage for a signal-strength detection apparatus, for instance. Thus in the present context, "command" is a signal which causes a measurement, and is to be distinguished from a signal which is measured.

According to a first aspect, a distance measuring system is provided for measuring a distance of a first transceiver, for instance a radio key or a smartphone for verifying a signal-strength measurement or locating the smartphone and for unlocking or locking a vehicle, from second transceivers, for instance distance measuring units on, or in, the vehicle. The distance measuring system comprises a first transceiver having a first time zone, a second transceiver having a second time zone, and a control unit having a control-unit time zone. A time zone can be understood to mean here a time in the associated component that is set by a clock or a clock chip in the device. The second transceiver is configured to ascertain a time-zone relationship Delta_SE2_SE1 between the second transceiver and the first transceiver, or time zone of the first transceiver, and to transmit the time-zone relationship Delta_SE2_SE1 to the control unit. The control unit is configured to receive the time-zone relationship Delta_SE2_SE1, and to ascertain, using the time-zone relationship Delta_SE2_SE1, a time-zone relationship Delta_ST_SE1 between the control-unit time zone and the first transceiver. The first transceiver is configured to transmit at a defined instant in time or for a defined time period of the first time zone a distance measurement command to the second transceiver. For example, the defined instant in time is a full second or a full minute or a time based on the time zone of the first transceiver, which is either system-defined or transferred at least once to the second transceivers. This instant in time is known to the second transceiver because the time of the first transceiver is known by virtue of the ascertained time-zone relationships. The first transceiver is also configured to transmit a measurement signal at a further defined instant in time, and the second transceiver is also configured to switch from an inactive into an active receiving or measuring state at the defined instants in time or the defined period, then to receive the distance measurement command or the measurement signal, to carry out a distance measurement and to shift again into an inactive measuring state.

In other words, the differences in the clocks or time zones are determined first between the first transceiver and the second transceiver, then between the second transceiver and the control unit, whereby all the time relationships are known.

The differences Delta_SE2_SE1 and Delta_ST_SE1 hence represent clock offsets or time-zone offsets, thereby achieving a form of "synchronization", although the clocks are not readjusted or affected by the "synchronization". As soon as the time zones are known, as described, to the control unit and to the second transceiver, a distance measurement can be carried out. The distance measurement can take place, for example, at predefined instants in time, for instance a few seconds after the "synchronization".

This makes it possible to carry out a measurement at a specific instant in time within a short time interval, and for the components involved in the measurement to be switched on selectively for this measurement, and then switched off again or placed into a sleep state until the next measurement. This saves energy in these components involved, thereby extending their service life or maintenance intervals, for instance if they are battery-operated, and/or meaning they require a smaller energy supply, for example a smaller power supply unit. The latter applies in particular to the second transceivers, for example measurement units in the vehicle, which measure the measurement signal.

According to one embodiment, the first transceiver comprises a first clock, which defines the first time zone. The second transceiver comprises a second clock, which defines the second time zone. The first control unit comprises a control-unit clock, which defines the first control-unit time zone. The first clock, the second clock, and the control-unit clock are configured to define independently of the other time zones, the time zones that they each define. This means that the clocks in all the components can run fully independently of one another and need not run identically. It is sufficient to ascertain and to know the time difference between the time zones, which is then added or subtracted appropriately. Since the clocks run independently of one another, the differences Delta_SE2_SE1 and Delta_ST_SE1 between the time zones are determined or updated regularly.

According to one embodiment, the first transceiver comprises a time communication module and a measurement communication module. The second transceiver comprises a time communication module that corresponds to the first transceiver, and a measurement communication module that corresponds to the first transceiver. The time communication module of the first transceiver is configured to transmit a message, for determining the time-zone relationship between the first transceiver and the second transceiver, to the second transceiver by means of a first communication protocol, and the measurement communication module of the first transceiver is configured to transmit a measurement signal, for determining the distance between the first transceiver and the second transceiver, to the second transceiver by means of a second communication protocol.

This means that ascertaining the time difference between the time zones can be performed by the time communication module independently of the measurements, which take place via a second module, the measurement communication module. For example, the time-zone difference can be determined by a time communication module over a larger operating range of the communication connection, but carried out at longer time intervals than the distance measurement according to need and the energy required for this. With regard to determining the clock offset and measuring the distance, both the time communication module and the measurement communication module are activated only in the time in which corresponding communication actually takes place. During the communication-free times, they are off or deactivated, or are switched to standby or into a sleep state.

According to one embodiment, the first communication protocol is a Bluetooth communication protocol, and the second communication protocol is a UWB (ultra wideband) communication protocol. For example, a Bluetooth profile can be used in which are defined transmit and receive time stamps. The comparison of the time zones can take place by means of Bluetooth communication over a relatively large range of, for instance, ten meters or tens of meters. The actual distance measurement is performed preferably by means of UWB at a shorter range, for instance up to several meters. A special protocol can be used here, for example, in which the first transceiver and the second transceiver repeatedly transmit time stamps back and forth in order to obtain an accurate measurement.

According to one embodiment, the message for determining the time-zone relationship between the first transceiver and the second transceiver contains a transmit time stamp, and the second transceiver is configured to ascertain the time-zone relationship by means of the transmit time stamp and a receive time stamp. The same principle is preferably also applied in all cases in which time-zone relationships are ascertained, i.e. also between second transceiver and control unit.

According to one embodiment, the distance measurement is a transit-time measurement, and the first transceiver and the second transceiver are configured to determine the transit time by means of communication between the first transceiver and the second transceiver. By means of the communication, transmit and receive time stamps can be transferred, and the transit time can be determined from the difference therebetween. Hence there is no need for clock error correction via triangulation, as is common in satellite navigation, for example.

According to one embodiment, the distance measurement system also comprises one or more further second transceivers, wherein the further second transceivers each have their own independent time zone, and are configured to receive the time-zone relationship Delta_SE2_SE1 from the second transceiver or from the control unit, and in each case to ascertain therefrom their own time-zone relationship Delta_SE2x_SE1 with respect to the first transceiver. They are also configured to receive from the control unit a distance measurement signal at, or for, the defined instant in time, and to switch from an inactive into an active measuring state at this instant in time, then to receive the measurement signal from the transceivers, to carry out a distance measurement, and to shift back into an inactive measuring state. The above-described second transceiver can hence be seen as the "master", which determines the time-zone difference with respect to the first transceiver, and transmits the difference to the further second transceiver, with the result that these do not have to communicate with the first transceivers in order to determine the time-zone difference. The further second transceivers preferably have the same design as the master transceiver. This allows the control unit to select flexibly each of the second transceivers to be the master.

According to a further embodiment, the control unit is integrated in a second transceiver.

According to a further aspect, a smartphone is provided which comprises a first transceiver as described above. A smartphone can comprise various communication modules, for instance mobile communications, Bluetooth, NFC (near field communication), and, for example, can be controlled relatively easily by applications. There is hence no need to carry a further device. It is therefore suitable for use as a first transceiver.

According to a further aspect, a vehicle is provided which comprises a second transceiver and a control unit. The vehicle can comprise a plurality of transceivers, which are supplied from the vehicle power supply. The transceivers and the control unit can be connected to one another by wires or wirelessly. The antennas for the transceivers can be mounted, for example, on the vehicle roof or at the corners, in order to have a radiation area that is as large and unobstructed as possible. For example, such a vehicle may be an automobile, a bus, a truck or a rail-bound vehicle.

According to a further aspect, a method for measuring a distance of a first transceiver from second transceivers is provided, which comprises the following steps:

Ascertaining by the second transceiver a time-zone relationship Delta_SE2_SE1 between the second transceiver and the first transceiver, and transmitting the time-zone relationship Delta_SE2_SE1 to the control unit.

Receiving the time-zone relationship Delta_SE2_SE1 by the control unit (130) and ascertaining a time-zone relationship Delta_ST_SE1 between the control-unit time zone and the first transceiver (110) using the time-zone relationship Delta_SE2_SE1.

Transmitting a distance measurement command to the second transceiver at a defined instant in time or for a defined instant in time of the first time zone.

Transmitting a measurement signal by the first transceiver at a further defined instant in time.

Switching the second transceiver from an inactive into an active measuring state at the defined instants in time or the defined time period, receiving the measurement signal, carrying out a distance measurement, and shifting into an inactive measuring state by the second transceiver.

The steps of the method correspond to the above description of the system. As regards the order, determining the time-zone differences can also take place such that, for instance, the components in the vehicle, i.e. the second transceiver and further second transceivers and the control unit, takes place first, and thereafter the determination of the time-zone difference between the first and second time zones.

The distance measuring system can be used, for example, to verify that a user who is carrying a first transceiver is actually close to the transceiver. As regards a vehicle, the following usage scenarios are possible, for instance:

The user approaches the vehicle from a long way away in order to open up the vehicle. The vehicle is unlocked after verification of the user proximity.

The user gets into the opened vehicle or into an open vehicle, for instance construction machinery, and starts the vehicle. Starting is possible, for instance, only once the user proximity has been verified.

The user exits the vehicle after a triggered shut-down.

The user exits the vehicle and goes a long way away, with the result that the vehicle is locked once the user proximity can no longer be verified.

The user approaches the vehicle from a long way away, but stays close to the vehicle for a prolonged period without opening the door.

The user exits the vehicle, locks the vehicle and remains in the area covered by the time communication module or the measurement communication module, for example when the user remains in his house, which is close to the vehicle. In this case, the verification prevents the vehicle remaining open, because the spatial verification range has been exited.

According to a further aspect, the distance measuring system is used for a building entry system. In this usage, the building is unlocked only once the user proximity has been verified.

According to a further aspect, the distance measuring system is used for contactless payment or for cash withdrawal, with the result that the payment or the cash withdrawal is only possible once the user proximity has been verified.

Synergy effects can arise from different combinations of the embodiments, even though they may not be described in detail.

It must also be noted that although all the embodiments of the present invention that relate to a method can be implemented in the described order of steps, this need not be the only and essential order of the steps of the method. Unless expressly stated otherwise below, the methods presented here can be implemented using a different order of the disclosed steps without departing from the associated method embodiment.

In carrying out the claimed invention, a person skilled in the art can understand and implement other variations of the disclosed embodiments through studying the drawings, the disclosure and the accompanying claims. The word "including" in the claims does not exclude other elements or steps, and the indefinite article "a" does not exclude more than one. A single processor or another unit can fulfil the functions of a plurality of objects or steps presented in the claims. The mere fact that certain measures are defined in mutually dependent claims does not mean that a combination of these measures cannot be used advantageously. Reference signs in the claims should not be construed as limiting the scope of the claims.

Exemplary embodiments of the invention are explained in more detail below with reference to the schematic drawings, in which.

Figure 1:
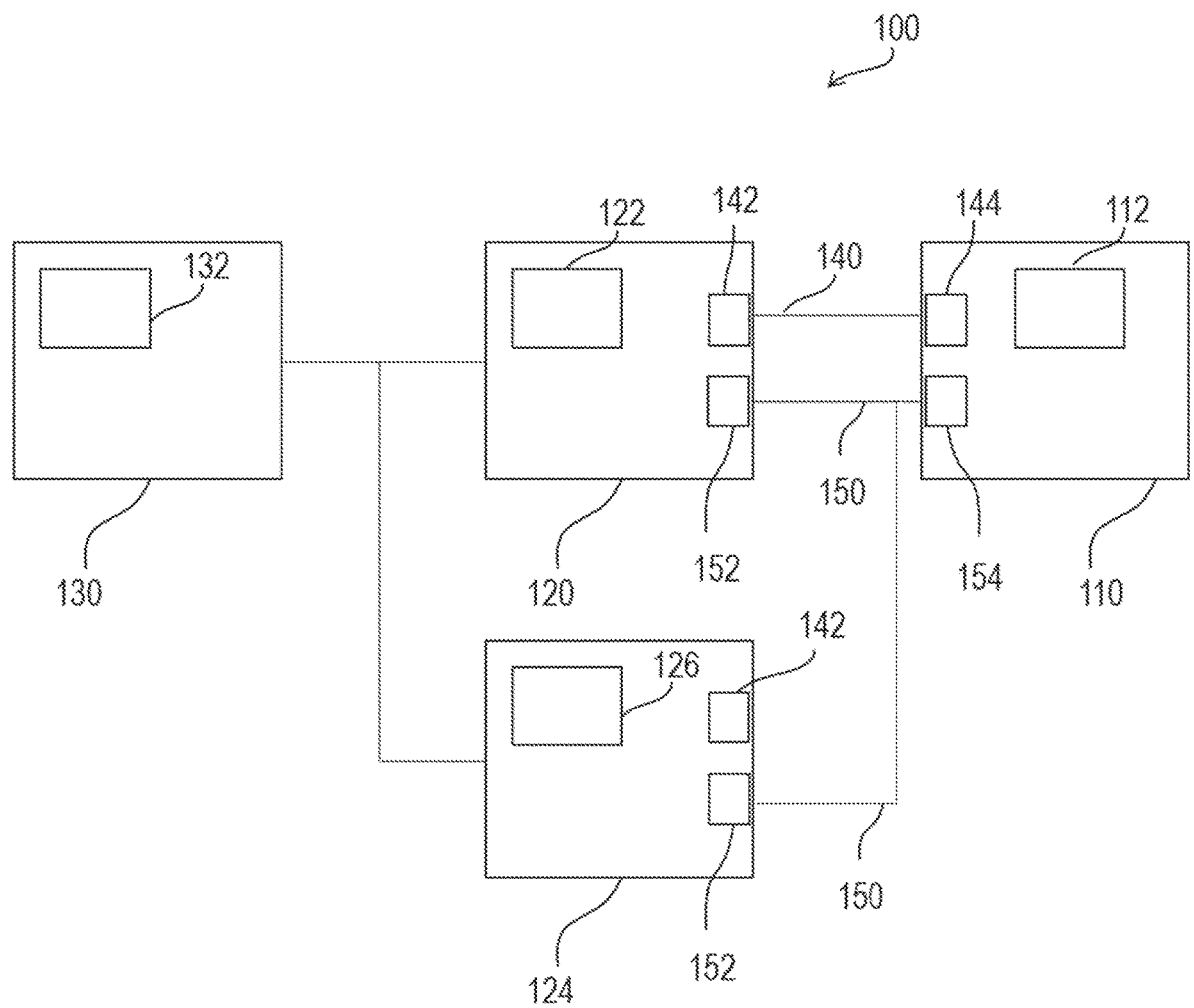
FIG. 1 shows a block diagram of a distance measuring system according to one exemplary embodiment.

FIG. 1 shows a block diagram of a distance measuring system 100 for measuring a distance of a first transceiver 110 from second transceivers 120, 124, having a first transceiver 110 and a clock 112, which defines a first time zone, having a second transceiver 120 and a clock 122, which defines a second time zone, and having a control unit 130 and a clock 132, which defines a control-unit time zone 132. In addition, a further second transceiver 124 is depicted having a clock 126, which defines a further second time zone. The first transceiver 110 comprises a time communication module 144 and a measurement communication module 154. The second transceivers correspondingly comprise a time communication module 142 and a measurement communication module 152. A time communication connection 140 is established in this example only between the first transceiver 110 and the second transceiver 120, whereas a measurement communication connection 150 is established between the first transceiver 110 and both the second transceiver 120 and the further second transceiver 124. Further connections exist between the second transceivers 120, 124 and the control unit 130.

Figure 2:
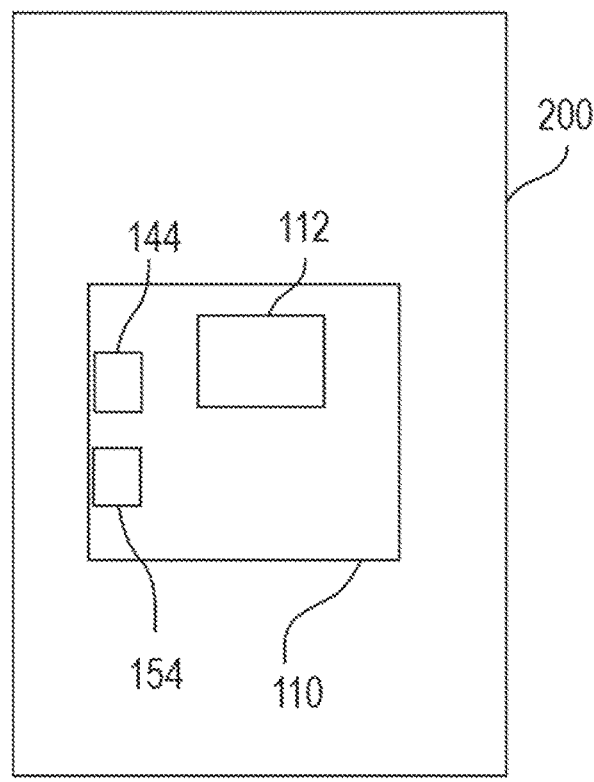
FIG. 2 shows a block diagram of a smartphone having a first transceiver.

FIG. 2 shows a smartphone 200 having a first transceiver.

Figure 3:
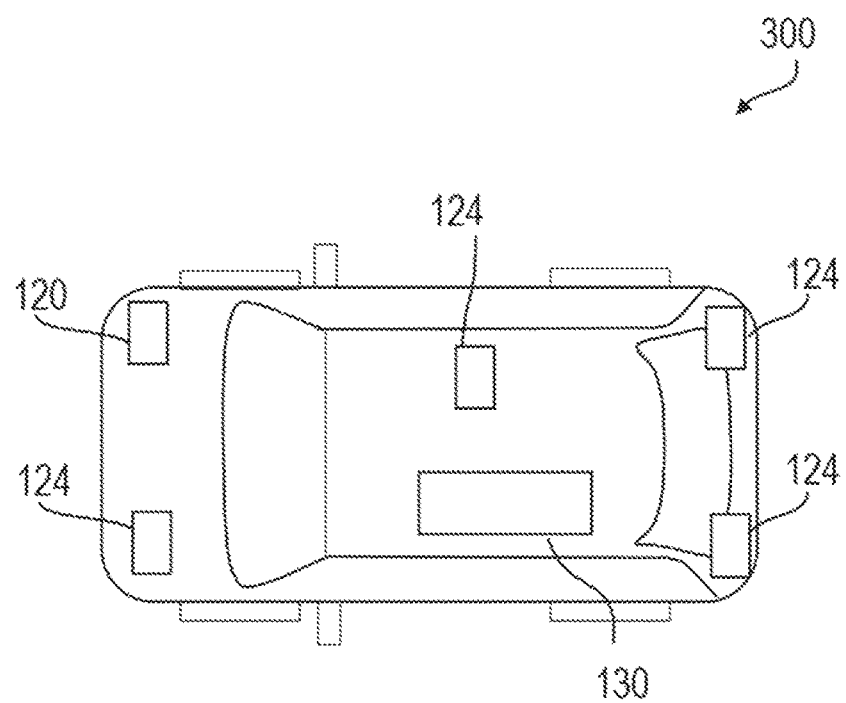
FIG. 3 shows a block diagram of a vehicle having a control unit and second transceivers.

FIG. 3 shows a block diagram of a vehicle having a control unit 130, a second transceiver 120 and further second transceiver 124.

Figure 4:
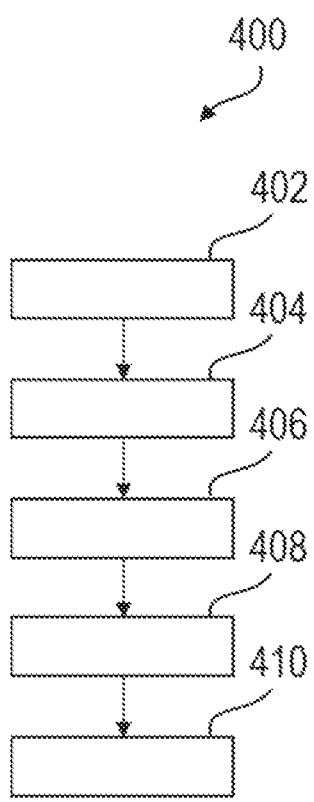
FIG. 4 shows a flow diagram of a method for measuring a distance of a first transceiver from second transceivers.

FIG. 4 shows a flow diagram of a method for measuring a distance of a first transceiver from second transceivers, having the steps:

Ascertaining 402 by the second transceiver 120 a time-zone relationship Delta_SE2_SE1 between the second transceiver 120 and the first transceiver 110, and transmitting the time-zone relationship Delta_SE2_SE1 to the control unit 130.

Receiving 404 the time-zone relationship Delta_SE2_SE1 and the time-zone relationship Delta_SE2_SE1 by the control unit 130, and ascertaining a time-zone relationship Delta_ST_SE1 between the control-unit time zone and the first transceiver 110 using the time-zone relationship Delta_SE2_SE1.

Transmitting 406 a distance measurement command to the second transceiver at a defined instant in time or for a defined time period of the first time zone.

Transmitting 408 a measurement signal by the first transceiver at the defined instant in time.

Switching 410 the second transceiver from an inactive into an active measuring state at the defined instant in time or time period, receiving the measurement signal, carrying out a distance measurement, and shifting into an inactive measuring state by the second transceiver.

The invention claimed is:

1. A distance measuring system for measuring a distance of a first transceiver from a second transceiver, comprising:
the first transceiver having a first time zone,
the second transceiver having a second time zone,
a control unit in a control-unit time zone, wherein the second transceiver is configured to ascertain a time-zone relationship Delta_SE2_SE1 between the second transceiver and the first transceiver, and to transmit the time-zone relationship Delta_SE2_SE1 to the control unit, wherein the control unit is configured to receive the time-zone relationship Delta_SE2_SE1, and to ascertain, using the time-zone relationship Delta_SE2_SE1, a time-zone relationship Delta_ST_SE1 between the control-unit time zone and the first transceiver;

wherein the first transceiver is configured to transmit at a defined instant in time or for a defined time period a distance measurement command to the second transceiver, wherein the first transceiver is also configured to transmit a measurement signal at a further defined instant in time, and wherein the second transceiver is also configured to switch from an inactive into an active receiving or measuring state at the defined instants in time or the defined time period, then to receive the distance measurement command or the measurement signal, to carry out a distance measurement and to shift again into an inactive measuring state.

2. The distance measuring system as claimed in claim 1, wherein the first transceiver comprises a first clock, which defines the first time zone, the second transceiver comprises a second clock, which defines the second time zone, the control unit comprises a control-unit clock, which defines the control-unit time zone, and wherein the first clock, the second clock, and the control-unit clock are configured to define independently of other time zones, respective time zone that they each define.

3. The distance measuring system as claimed in claim 1, wherein the first transceiver comprises a first time communication module and a first measurement communication module, the second transceiver comprises a second time communication module that corresponds to the first transceiver, and a second measurement communication module that corresponds to the first transceiver, the first time communication module is configured to transmit a message, for determining time-zone relationship between the first transceiver and the second transceiver, to the second transceiver by a first communication protocol, and the first measurement communication module is configured to transmit a measurement signal, for determining the distance between the first transceiver and the second transceiver, to the second transceiver by a second communication protocol.

4. The distance measuring system as claimed in claim 3, wherein the first communication protocol is a Bluetooth communication protocol, and the second communication protocol is an ultra wideband communication protocol.

5. The distance measuring system as claimed in claim 3, wherein the message for determining the time-zone relationship between the first transceiver and the second transceiver contains a transmit time stamp, and wherein the second transceiver is configured to ascertain the time-zone relationship by the transmit time stamp and a receive time stamp.

6. The distance measuring system as claimed in claim 1, wherein the distance measurement is a transit-time measurement, and wherein the first transceiver and the second transceiver are configured to determine the transit time by communication between the first transceiver and the second transceiver.

7. The distance measuring system as claimed in claim 1, also comprising one or more further second transceivers, wherein the further second transceivers each have their own independent time zone, and are configured to receive the time-zone relationship Delta_SE2_SE1 from the second transceiver or from the control unit, and in each case to ascertain therefrom their own time-zone relationship Delta_SE2x_SE1 with respect to the first transceiver, and are configured to receive from the control unit a distance measurement signal at, or for, the defined instant in time, and to switch from an inactive into an active measuring state at this instant in time, then to receive the measurement signal from transceivers, to carry out a distance measurement, and to shift back into the inactive measuring state.

8. The distance measuring system as claimed in claim 1, wherein the control unit is integrated in the second transceiver.

9. A smartphone comprising the first transceiver as claimed in claim 1.

10. A vehicle comprising the second transceiver and the control unit as claimed in claim 1.

11. A method for measuring a distance of a first transceiver from second transceivers, comprising:

ascertaining by the second transceiver a time-zone relationship Delta_SE2_SE1 between the second transceiver and the first transceiver, and transmitting the time-zone relationship Delta_SE2_SE1 to a control unit;

receiving the time-zone relationship Delta_SE2_SE1 by the control unit and ascertaining a time-zone relationship Delta_ST_SE1 between a control-unit time zone and the first transceiver using the time-zone relationship Delta_SE2_SE1;

transmitting a distance measurement command to the second transceiver at a defined instant in time or for a defined time period of a time zone of the first transceiver;

transmitting a measurement signal by the first transceiver at a further defined instant in time;

switching the second transceiver from an inactive into an active measuring state at the defined instants in time or the defined time period, receiving the measurement signal, carrying out a distance measurement, and shifting into the inactive measuring state by the second transceiver.

12. Use of the distance measuring system as claimed in claim 1 in a building entry system.

13. Use of the distance measuring system as claimed in claim 1 in contactless payment or cash withdrawal.

14. Use of the distance measuring system as claimed in claim 1 in an authorization system for enabling functions of machines.

* * * * *